US011615624B2

(12) United States Patent
Yigit et al.

(10) Patent No.: US 11,615,624 B2
(45) Date of Patent: *Mar. 28, 2023

(54) AUTOMATED ASSOCIATION OF MEDIA WITH OCCURRENCE RECORDS

(71) Applicant: GENETEC INC., St-Laurent (CA)

(72) Inventors: Chris Yigit, Pierrefonds (CA); Robert Amante, Laval (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/316,801

(22) Filed: May 11, 2021

(65) Prior Publication Data

US 2021/0374425 A1 Dec. 2, 2021

Related U.S. Application Data

(63) Continuation of application No. 16/430,955, filed on Jun. 4, 2019, now Pat. No. 11,036,997.

(Continued)

(51) Int. Cl.
*G06F 21/62* (2013.01)
*G06V 20/52* (2022.01)
(Continued)

(52) U.S. Cl.
CPC .......... *G06V 20/52* (2022.01); *G06F 21/6218* (2013.01); *G06F 21/84* (2013.01); *G06V 20/46* (2022.01); *G06V 20/625* (2022.01)

(58) Field of Classification Search
None
See application file for complete search history.

(56) References Cited

U.S. PATENT DOCUMENTS 11,036,997 B2 * 6/2021 Yigit .................... G06V 20/54
2013/0266190 A1 10/2013 Wang et al.
(Continued)

FOREIGN PATENT DOCUMENTS

CN 107948585 A 4/2018
WO 2016/089918 A1 6/2016
(Continued)

*Primary Examiner* — Christopher G Findley

(57) ABSTRACT

A system, method and program storage device are provided for automatically associating evidence recorded by a plurality of cameras with a discrete occurrence, including: receiving occurrence data pertaining to the discrete occurrence and storing at least a portion of the occurrence data in an occurrence record; receiving first evidence data comprising at least a video data portion and a metadata portion of the evidence recorded by a first camera of the plurality of cameras and storing it in an evidence record; receiving second evidence data comprising at least a video data portion and a metadata portion of the evidence recorded by a second camera of the plurality of cameras and storing it in the evidence record; automatically associating information stored in the evidence record with information stored in the occurrence record based on a correspondence of at least two criteria including a first criterion of time; identifying, based on the automatic association, a first image data portion of the evidence recorded by the first camera that is related to the discrete occurrence while excluding a second image data portion of the evidence recorded by the first camera that is unrelated to the discrete occurrence; and identifying, based on the automatic association, a third image data portion of the evidence recorded by the second camera that is related to the discrete occurrence while excluding a fourth image data portion of the evidence recorded by the second camera that is unrelated to the discrete occurrence.

21 Claims, 6 Drawing Sheets

Related U.S. Application Data

(60) Provisional application No. 62/685,673, filed on Jun. 15, 2018, provisional application No. 62/680,577, filed on Jun. 4, 2018.

(51) Int. Cl.
*G06F 21/84* (2013.01)
*G06V 20/40* (2022.01)
*G06V 20/62* (2022.01)

(56) References Cited

U.S. PATENT DOCUMENTS

| | | |
|---|---|---|
| 2015/0104073 A1 | 4/2015 | Rodriguez-Serrano et al. |
| 2015/0248595 A1 | 9/2015 | Khan et al. |
| 2016/0042767 A1 | 2/2016 | Araya et al. |
| 2016/0119667 A1 | 4/2016 | Layson, Jr. et al. |
| 2016/0196702 A1 | 7/2016 | Wilson |
| 2017/0018047 A1 | 1/2017 | Hanchett et al. |
| 2017/0076140 A1 | 3/2017 | Wanguch et al. |
| 2017/0251231 A1 | 8/2017 | Fullerton et al. |
| 2018/0025636 A1 | 1/2018 | Boykin et al. |
| 2018/0027260 A1 | 1/2018 | Laganiere et al. |
| 2018/0144426 A1 | 5/2018 | Grbac et al. |

FOREIGN PATENT DOCUMENTS

| | | |
|---|---|---|
| WO | 2017/015297 A1 | 1/2017 |
| WO | 2017/083985 A1 | 5/2017 |
| WO | 2018/049514 A1 | 3/2018 |
| WO | 2018/075443 A1 | 4/2018 |

\* cited by examiner

AUTOMATED ASSOCIATION OF MEDIA WITH OCCURRENCE RECORDS

CROSS-REFERENCE TO RELATED APPLICATIONS

The present application is a continuation of U.S. application Ser. No. 16/430,955 filed on Jun. 4, 2019, which claims priority to U.S. Provisional Patent Application No. 62/680,577 titled Automated Association of Bodycam Footage and Occurrence Records filed on Jun. 4, 2018, and to U.S. Provisional Patent Application No. 62/685,673 titled Automated Association of Bodycam Footage and Occurrence Records filed on Jun. 15, 2018, the entire disclosures of which are hereby incorporated by reference.

TECHNICAL FIELD

Embodiments of the present disclosure generally relate to media from surveillance cameras and the like, and more particularly relate to automated association of such media with occurrence records.

DISCUSSION OF RELATED ART

Media such as video footage may be obtained from a variety of sources such as fixed or stationary cameras, Earth-facing satellite cameras, external vehicle-mounted cameras (e.g., land, sea and/or air), dashboard cameras (dashcams), mobile telephone cameras, drone cameras, body cameras (bodycams), and the like. Such video footage may be useful in real-time investigative efforts and may be potentially admissible as evidence in court proceedings. For timely investigations, the bottle-neck is often the process of distinguishing and requisitioning the potentially pertinent video footage for in-depth review, particularly where direct access to such video is restricted due to privacy, security, and/or confidentiality concerns.

When a bodycam captures video footage that may be relevant to a particular occurrence, some technologies require manual assignment of the relevant bodycam video file to the occurrence. For example, an officer wearing a bodycam having returned to their station from a patrol would upload files from their bodycam and manually mark a file as being relevant to a particular occurrence.

If the occurrence were already associated with a police case number, the officer would mark a video file as being related to that case, or would specifically upload it into a case interface for that particular case number. This requires the officer to self-report bodycam footage (BCF), which can lead to errors and/or conflicts of interest.

Moreover, an occurrence is not always identified as noteworthy until much later. For example, if an officer tickets a car that is later discovered to have been involved in a crime, it may be desirable to review the officer's bodycam footage, however this footage would not have been associated with the crime at the time it was uploaded. The result is that a manual search for relevant footage must be done. This can be particularly problematic if unremarkable bodycam footage is deleted after a certain period of time. It could be that relevant bodycam video was captured but is deleted before its importance is appreciated.

Bodycam footage can be notoriously difficult to ascribe to relevant occurrences. Although the time of capture of the footage may be documented in metadata, the relationship between footage and events may be hard to establish, leading to a lot of time spent searching for potentially relevant footage, and missed opportunities when the relevant footage is not readily available or not found at all. The content of this section does not constitute an admission of prior art.

SUMMARY

An exemplary embodiment method is provided for automatically associating evidence recorded by a body camera with a discrete occurrence, the method including: receiving occurrence data pertaining to the discrete occurrence and storing at least a portion of the occurrence data in an occurrence record; receiving evidence data comprising at least a video data portion and a metadata portion of the evidence recorded by the body camera and storing it in an evidence record; automatically associating information stored in the evidence record with information stored in the occurrence record based on a correspondence of at least two criteria including a first criterion of time; and identifying, based on the automatic association, a first image data portion of the evidence recorded by the body camera that is related to the discrete occurrence while excluding a second image data portion of the evidence recorded by the body camera that is unrelated to the discrete occurrence.

An exemplary embodiment method is provided for automatically associating evidence recorded by a plurality of cameras with a discrete occurrence, the method including: receiving occurrence data pertaining to the discrete occurrence and storing at least a portion of the occurrence data in an occurrence record; receiving first evidence data comprising at least a video data portion and a metadata portion of the evidence recorded by a first camera of the plurality of cameras and storing it in an evidence record; receiving second evidence data comprising at least a video data portion and a metadata portion of the evidence recorded by a second camera of the plurality of cameras and storing it in the evidence record; automatically associating information stored in the evidence record with information stored in the occurrence record based on a correspondence of at least two criteria including a first criterion of time; identifying, based on the automatic association, a first image data portion of the evidence recorded by the first camera that is related to the discrete occurrence while excluding a second image data portion of the evidence recorded by the first camera that is unrelated to the discrete occurrence; and identifying, based on the automatic association, a third image data portion of the evidence recorded by the second camera that is related to the discrete occurrence while excluding a fourth image data portion of the evidence recorded by the second camera that is unrelated to the discrete occurrence.

The method may be used where the occurrence data includes a location of the discrete occurrence, and the metadata includes a camera location. The method may be used where the at least two criteria include a second criterion of descriptive location such as street address, geolocation such as global positioning system (GPS) coordinates, user identification (ID), officer ID, camera ID, bodycam ID, car ID, license plate reader (LPR) system ID, license plate ID, or suspect ID.

The method may be used where the at least two criteria include a criterion of location. The method may be used where the at least two criteria include a criterion of descriptive location. The method may be used where the at least two criteria include a criterion of street address. The method may be used where the at least two criteria include a criterion of geolocation. The method may be used where the at least two criteria include a criterion of global positioning system (GPS) coordinates. The method may be used where the at least two criteria include a criterion of user identification (ID). The method may be used where the at least two criteria include a criterion of officer ID. The method may be used where the at least two criteria include a criterion of camera ID. The method may be used where the at least two criteria include a criterion of bodycam ID. The method may be used where the at least two criteria include a criterion of car ID. The method may be used where the at least two criteria include a criterion of license plate reader (LPR) system ID. The method may be used where the at least two criteria include a criterion of license plate ID. The method may be used where the at least two criteria include a criterion of suspect ID.

The method may be used where at least one of the plurality of cameras is a bodycam. The method may be used where at least one of the plurality of cameras is a license plate reader. The method may be used where the occurrence data includes a location of the discrete occurrence, and the location of the second camera is derived from at least one of a geolocation receiver directly connected to the second camera, or a geolocation receiver connected in signal communication with the first camera and an association in at least one of the occurrence record or the evidence record between the location of the second camera and at least one of the location of the first camera or the location of the occurrence.

The method may be used where one of the occurrence data or the evidence data includes or implies an authorization or permission for a user to view said occurrence data or at least a portion of said evidence data, respectively, the method including granting access permissions for body camera footage (BCF) associated with the occurrence data; updating access permissions for evidence data based on automatic association of at least two criteria of said evidence data with the occurrence data; and providing access for the user to view the occurrence data and all identified image data portions of the evidence that are related to the discrete occurrence. The method may be used where at least some of the data is encrypted, further comprising decrypting for the user the occurrence data and all identified image data portions of the evidence that are related to the discrete occurrence.

The method may include identifying a relationship between an identifier contained in the metadata associated with the evidence data and an identifier contained in the occurrence data. The method may include identifying a colocation of at least one geolocation described in the metadata associated with the evidence data and a geolocation described in the occurrence data.

The method may include identifying a license plate identifier contained in the metadata associated with the evidence data and in the occurrence data. The method may be used where the discrete occurrence is a license plate read and the occurrence data comprises a plate read event generated by a license plate reading system.

The method may be used where identifying is performed based on extra data obtained from a third source. The method may be used where identifying is triggered by receiving the evidence data. The method may be used where identifying is triggered by receiving the occurrence data.

The method may include identifying a video segment of the evidence data on the basis of a discrete time related to the occurrence data and a predetermined timeframe. The method may relate to gathering law enforcement evidence undertaken on a server of a law enforcement evidence gathering system.

An exemplary embodiment system is provided and configured to perform the above-described methods while gathering evidence for law enforcement, the system including a law enforcement server having a data ingestion engine; and a data receiver interface comprising a first signal connection between the server and a license plate reader (LPR) system and a second signal connection between the server and a bodycam.

The system may be configured such that at least one of the first or second connections comprises a wireless network connection to receive data in real-time. The system may be configured such that at least one of the first or second connections comprises an intermittent connection configured to receive data on an on-demand basis wherein the data ingestion engine is configured to trigger automatic association upon receipt of said data. The system may be configured such that the server is a cloud-based server.

An exemplary embodiment program storage device is provided tangibly embodying a non-transitory program of instructions executable by a processor for automatically associating evidence recorded by a plurality of cameras with a discrete occurrence, the instructions comprising: receiving occurrence data pertaining to the discrete occurrence and storing at least a portion of the occurrence data in an occurrence record; receiving first evidence data comprising at least a video data portion and a metadata portion of the evidence recorded by a first camera of the plurality of cameras and storing it in an evidence record; receiving second evidence data comprising at least a video data portion and a metadata portion of the evidence recorded by a second camera of the plurality of cameras and storing it in the evidence record; automatically associating information stored in the evidence record with information stored in the occurrence record based on a correspondence of at least two criteria including a first criterion of time; identifying, based on the automatic association, a first image data portion of the evidence recorded by the first camera that is related to the discrete occurrence while excluding a second image data portion of the evidence recorded by the first camera that is unrelated to the discrete occurrence; and identifying, based on the automatic association, a third image data portion of the evidence recorded by the second camera that is related to the discrete occurrence while excluding a fourth image data portion of the evidence recorded by the second camera that is unrelated to the discrete occurrence.

BRIEF DESCRIPTION OF THE DRAWINGS

Aspects of the present disclosure may be appreciated upon consideration of the following description of exemplary embodiments when taken in conjunction with the accompanying drawings, in which.

DETAILED DESCRIPTION

Figure 1:
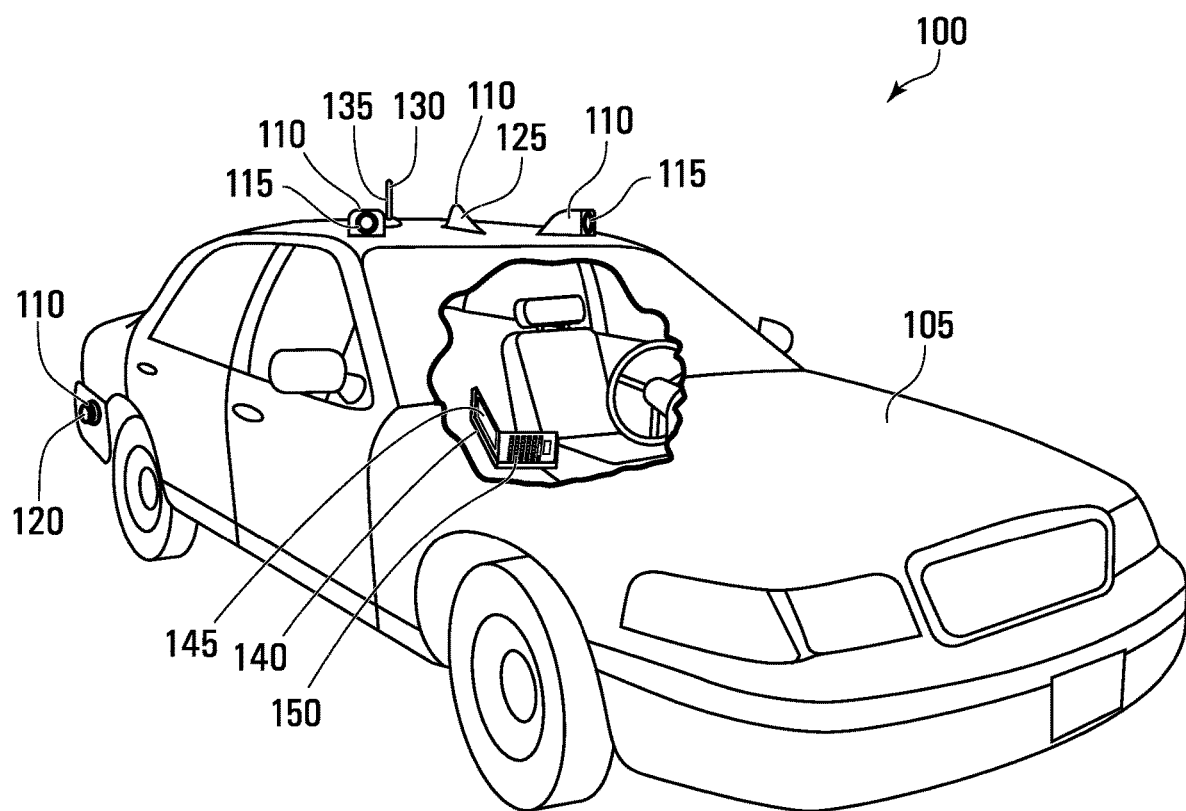
FIG. 1 is a schematic diagram illustrating a vehicle-based license plate reading (LPR) system in accordance with an exemplary embodiment of the present disclosure.

A system and method for automated association of media with occurrence records is provided. For the purposes of this disclosure, the term "media" includes previously recorded media as well as real-time media capture.

Media from surveillance cameras and the like may be automatically associated with occurrence reports and/or records for identification and consideration of potentially relevant media in connection with an investigation of an actionable occurrence, for example. This may be automated such that the association of relevant surveillance media with occurrence records takes place substantially without human interaction when matches are found based on predetermined matching criteria during real-time or expeditious computer processing. However, human interaction could be used to augment such criteria. Advantageously, however, by creating associations without requiring human access to the evidence data itself, the system may protect the data against tampering, deletion or other corruption. It may also allow for a protected chain of custody of the data. Although such associations might be performed manually for use as evidence in court proceedings taking place well after an initial incident or crime has occurred, this might be too late to bring timely assistance to the victims of such incidents or prevent follow-on crimes. Automated association of such media with occurrence reports and/or records may be enabled by a novel system and/or data structure.

Body-worn video (BWV), body-worn cameras or body cameras (bodycams) include small cameras that may be clipped onto a public safety officer's uniform, worn as a headset, or the like. Such cameras may be activated to record video footage of law enforcement encounters with the public, for example.

A dashboard camera (dashcam) is an onboard camera that may continuously record the view through a vehicle's windshield. It may be attached to the interior windshield or to the top of the dashboard, by suction cup or adhesive mount, for example. Police dashcams may provide video evidence in the event of a road accident, for example. Additionally, police forces frequently use different types of cameras mounted in or on the exterior of movable vehicles or on stationary mounts.

The recordings of such devices may be subject to various laws, rules and regulations, in addition to common sense. For example, the video may be encrypted and access may be limited to those investigating an incident with an elucidated nexus to a recording. Moreover, in order to be admissible in a legal proceeding, it must generally be demonstrable that the chain of custody for a given media stream has been respected.

Some bodycams offer real-time video streaming. Some offer wireless trigger options for automatic recording. Agencies may select inputs that will trigger body-worn cameras to automatically turn on without manual activation, such as when turning on a cruiser's lights or sirens, upon crash sensor activation, when the car reaches a certain speed, when nearby dashboard cameras or body cameras are switched on, or when a weapon is drawn such as by sensing with a wireless holster, for example. Some body-worn cameras may provide short periods of sound-free video footage from before the time the camera officially begins recording. Footage is generally uploaded to external databases maintained by police agencies or third-party vendors.

License plate reading (LPR) technology is used in many applications. This is optionally associated with law enforcement, municipal parking bylaw enforcement, police public protection including detection of individuals wanted in connection with a warrant, and/or private security and on-site rules enforcement.

Such video media is generally saved with time and date stamps as well as location information based on geolocation such as GPS coordinates, and encrypted for privacy and/or security. Most such media is then saved in restricted-access storage.

Access to such media is often severely restricted due to privacy concerns or the like, so identifying relevant media footage in the first place might involve a considerable effort to identify which existing footage is likely to meet proximate time, place, content and/or relationship to other criteria in order to gain authorization for viewing prior to review of such footage. Furthermore, bodycam devices used by police forces may expose a risk if they are stolen. In addition to the risk of losing evidence, there exists a risk of improper disclosure of privileged, confidential, sensitive and/or private information of identifiable private citizens, for example.

Embodiments of the present disclosure address access control and transmission of encrypted media recordings. As security, privacy, collaboration, and storage requirements increase, the complexity of security monitoring and investigational scenarios correspondingly rises leading to increasingly challenging system architectures and implementations. For example, when privacy requirements dictate the encryption of all streams from one scene (e.g., video, audio and/or any other metadata streams related to a designated location), while having some streams made accessible to only a first group of users and some other streams accessible only to a second group of users, the access control of each stream versus the user who requests access may be difficult and/or time-consuming to implement, particularly where streams represent an unbounded quantity of information that may vary over time.

It might also be required that only a portion of a stream be provided to specific users, where the remainder of the stream must not be accessed by such users. Permissions might be granted to another group of users for the same stream. A user having access to a specific stream, or a part of it, might also provide access to another user in authorized environments. Methods to enable such scenarios under some architectures imply the decryption and re-encryption of the complete data stream, which may be a resource intensive operation.

The challenges inherent in data stream distribution are further exacerbated by growing sensitivity about how personally-identifiable information data (PII), embedded within streams of data, is accessed, shared, employed and retained by investigators. An investigator may be a user who has an authorized interest in examining the contents of, or information about, a combination of data streams. Such an investigator might be, for example, a law enforcement agent, prosecutor, member of the security services or para-military organization, security contractor, private investigator, vendor contracted to enable forensic investigations or surveillance, crime analyst, marketing or business intelligence analyst, or automated system performing the functions of an investigator.

Per the United States Department of Commerce' NIST (Special Publication 800-122), PII includes "any information about an individual including (1) any information that can be used to distinguish or trace an individual's identity and (2) any other information that is linked or linkable to an individual. Linked information is information about or related to an individual that is logically associated with other information about the individual. In contrast, linkable information is information about or related to an individual for which there is a possibility of logical association with other information about the individual."

The data governance challenges inherent in data stream distribution may be further exacerbated in situations in which PII is captured by one party ("Originator") and provided to third parties for the aggregation, synthesis and sense-making of information contained in, or about, the data streams ("Aggregator"). By way of illustration, an Originator may be a social media service provider or a retail merchant, interested in ensuring that certain PII of their clients is accessed by Investigators only when there is a legitimate need to do so. Social media feeds containing PII information may be encrypted by default while offering access to only an anonymized version. Providing to the public an anonymized version of the social media feeds may reduce unintended, improper and/or unauthorized uses such as profiling and the like.

An exemplary embodiment system may provide support for complex scenarios that would be hard to manage under other system architectures, such as those based on discrete blocs of data having database indexes as the only links between them. A system architecture based on streams of metadata (e.g., streams of data about the other data, which may be other streams) may be used to collect, store, manage, and replay constituent streams of a logical scenario, where those streams might be stored asynchronously and synchronized only when the scenario is rendered, for example.

As shown in FIG. 1, a vehicle-based license plate reading (LPR) system in accordance with an exemplary embodiment of the present disclosure is indicated generally by the reference numeral 100. The LPR system 100 is shown in connection with a host vehicle 105 and comprises at least one license plate reading camera 115, which is optionally an infrared camera with an infrared light source that provides good illumination of a license plate. The LPR system 100 may also include one or more context camera(s) capturing context images related to a license plate read, such as color images of the vehicle around the license plate area. Such context camera(s) may be included as part of the license plate reading camera(s) 115, or separately. In the illustrated embodiment, a tire imaging camera 110 is included to take images of tires, where such images might be used in connection with tire tracks associated with an occurrence record, for example.

The system optionally also comprises processing logic that analyses images captured by the license plate reading camera to derive a license plate number. This may be provided in a trunk unit computer that may be connected to the license plate reading cameras 115, and which receives images therefrom and performs license plate recognition on the images to identify licenses plates therein by their associated license plate numbers and jurisdiction of issuance.

The system optionally includes a human interface comprising an output device, such as a display 145 and an input device 150, which in this exemplary embodiment are a keyboard and mouse, but are not limited thereto. Here, the human interface comprises a laptop 140 inside the vehicle 105's passenger compartment. The human interface presents to a user information derived by the system 100, and allows the user to interact with the LPR system 100, including inputting information to it.

For example, the display 145 may show both license plate images and the license plate number, as recognized by the system 100, to the user, and allow the user to verify that the plate was accurately read. The system 100 may allow the user to enter a correction in the plate number if the user notices that it was misread. The display may also present to the user contextual images and information associated with the read license plate, such as vehicle registration information (e.g., whether it's currently valid); vehicle owner information (e.g., whether the owner has a valid driver's license, whether the owner is wanted under a warrant, whether the owner has an obligation to use a DUI-related ignition interlock, or the like); and parking information (e.g., whether a vehicle may be violating a parking rule, such as if it was previously found here on the same day beyond the maximum parking time allowance, or whether the car is associated with a currently valid parking permit).

Body wearable cameras or bodycams are increasingly used to capture video and images. Such video may include interactions with the public involving hired personnel, particularly law-enforcement personnel such as police officers, municipal bylaw enforcement officers and parking agents.

Figure 2:
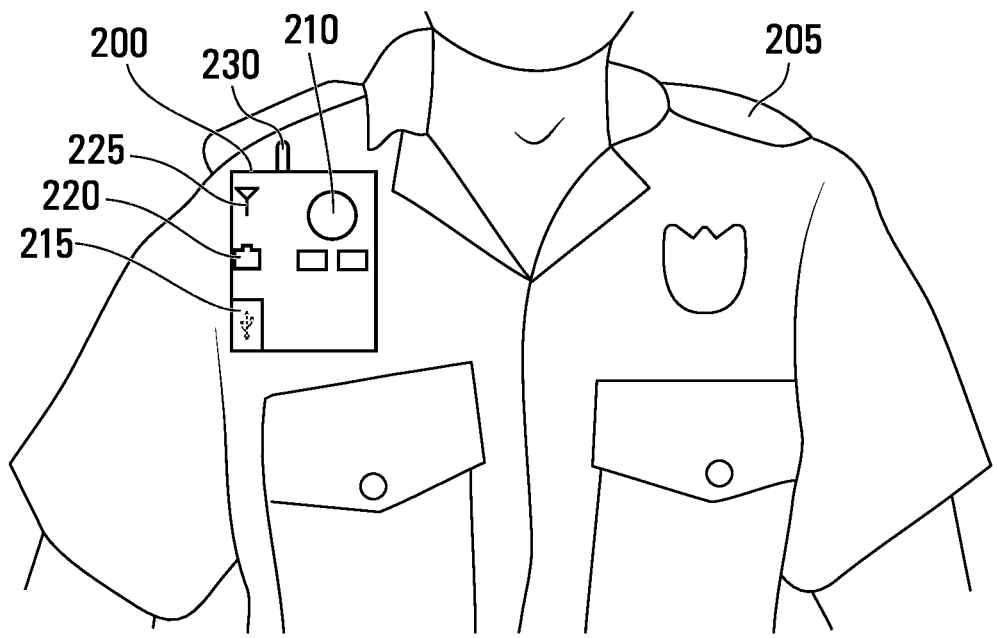
FIG. 2 is a schematic diagram illustrating a body camera (bodycam) in accordance with an exemplary embodiment of the present disclosure.

Turning to FIG. 2, a body camera (bodycam) in accordance with an exemplary embodiment of the present disclosure is indicated generally by the reference numeral 200. Here, the bodycam 200 may be used by a wearer 205 engaged in law enforcement. Optionally, the bodycam 200 comprises at least one camera 210 to capture events and interventions by the wearer 205, local storage for storing video data recorded by the camera 210, and processing logic to control bodycam functions. The bodycam 210 includes one or more means of communicating video data to an external device or server, such as a USB interface 215 with which the bodycam 210 may be plugged into a computing device to transfer files (e.g., either directly into the server or via a computer that uploads the files to the server). Here, the bodycam 200 may behave as a USB drive when connected for upload.

The bodycam 200 may also include a network interface 220 through which the bodycam 200 may be connected to a network, through which it may communicate video files either directly to the server or through an intermediary computer which receives the files. Note that the network interface 220 may comprise wired or wireless (e.g., satellite, cellular, Wi-Fi™, etc.) interfaces. The bodycam 200 may include a wireless interface 225 to communicate over cellular telephony networks, such as by LTE or the like. Such an embodiment may transfer video files or stream live video. In this particular embodiment, the bodycam 200 also includes a GPS module including a GPS antenna 230 which records the bodycam 200's geolocation. The geolocation is then added as metadata to the video recorded by the bodycam, although geolocation logs may also be kept when video is not being recorded. In general, bodycam 200 footage may be transmitted, such as, for example, by a user to a server on demand, although in some instances it may also be automatically uploaded to the server and/or live streamed to the server. Optionally, the bodycam may be plugged into a computer to transfer video files manually via the computer.

Every bodycam may be identifiable by a respective bodycam identifier (BID). The BID may be a unique identifier, although it need not be completely unique. In some scenarios, it may suffice that the bodycam is distinctive enough to allow an entity controlling multiple bodycams to distinguish between them.

Figure 3:
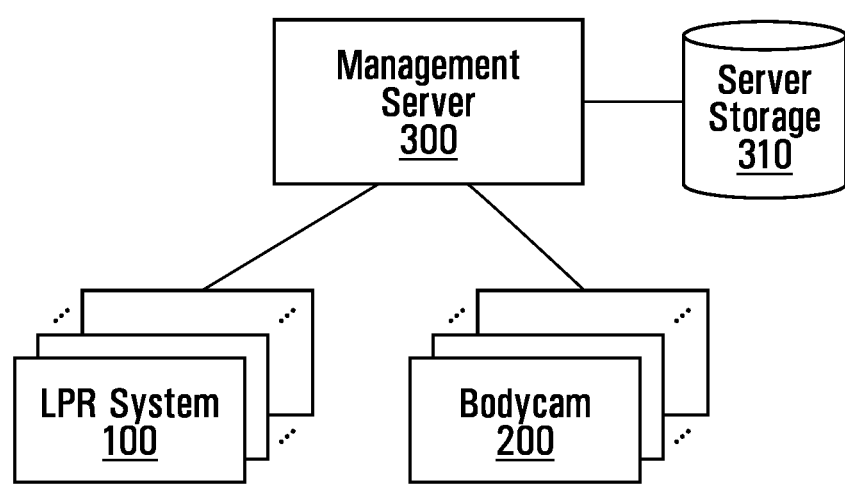
FIG. 3 is a block diagram illustrating a media management system in accordance with an exemplary embodiment of the present disclosure.

Turning now to FIG. 3, a media management system in accordance with an exemplary embodiment of the present disclosure is indicated generally by the reference numeral 300. The media management system 300 includes one or more servers 305, represented here as a single piece of equipment although it could be embodied as a cloud-based service, and server storage 310, which likewise could be cloud-based. The server 300 is in communication with other equipment, here including an LPR system 100 (optionally several) and/or a bodycam 200 (optionally several). The server 300 receives data from both LPR systems and bodycams and processes it as required, optionally storing/archiving license plate reads (including associated data such as locations, contextual images, and the like) and bodycam footage (BCF).

Optionally, the server includes programmed logic stored in non-volatile memory and implemented on a multi-purpose processing entity (e.g., a CPU), programmed according to the description provided here in a suitable programming language, and optionally compiled or interpreted. Although the system is described as a media management system, it may be more broadly a management system, or more particularly a law enforcement system, and even more particularly a law enforcement system for gathering and/or collating evidence. Evidence may include data associated with crimes and/or other events pertinent to law enforcement, such as, for example, subject matter related to an investigation, potential investigation, or a violation or potential violation of a law, rule or regulation.

The management server 300 may direct the bodycam 200 to engage recording, re-orient it's field of view, or the like based on bodycam or non-bodycam inputs. One example is where an associated LPR system 100 detects a license plate number already known by the management server 300 to have been involved in a more serious crime. In this case, the bodycam 200 might be automatically engaged, streamed and/or re-oriented upon direction of the server 300. Similarly, the LPR system 100 might be automatically engaged to record license plate numbers upon the server 300 receiving a panic button press or the like from the bodycam 200.

Figure 4:
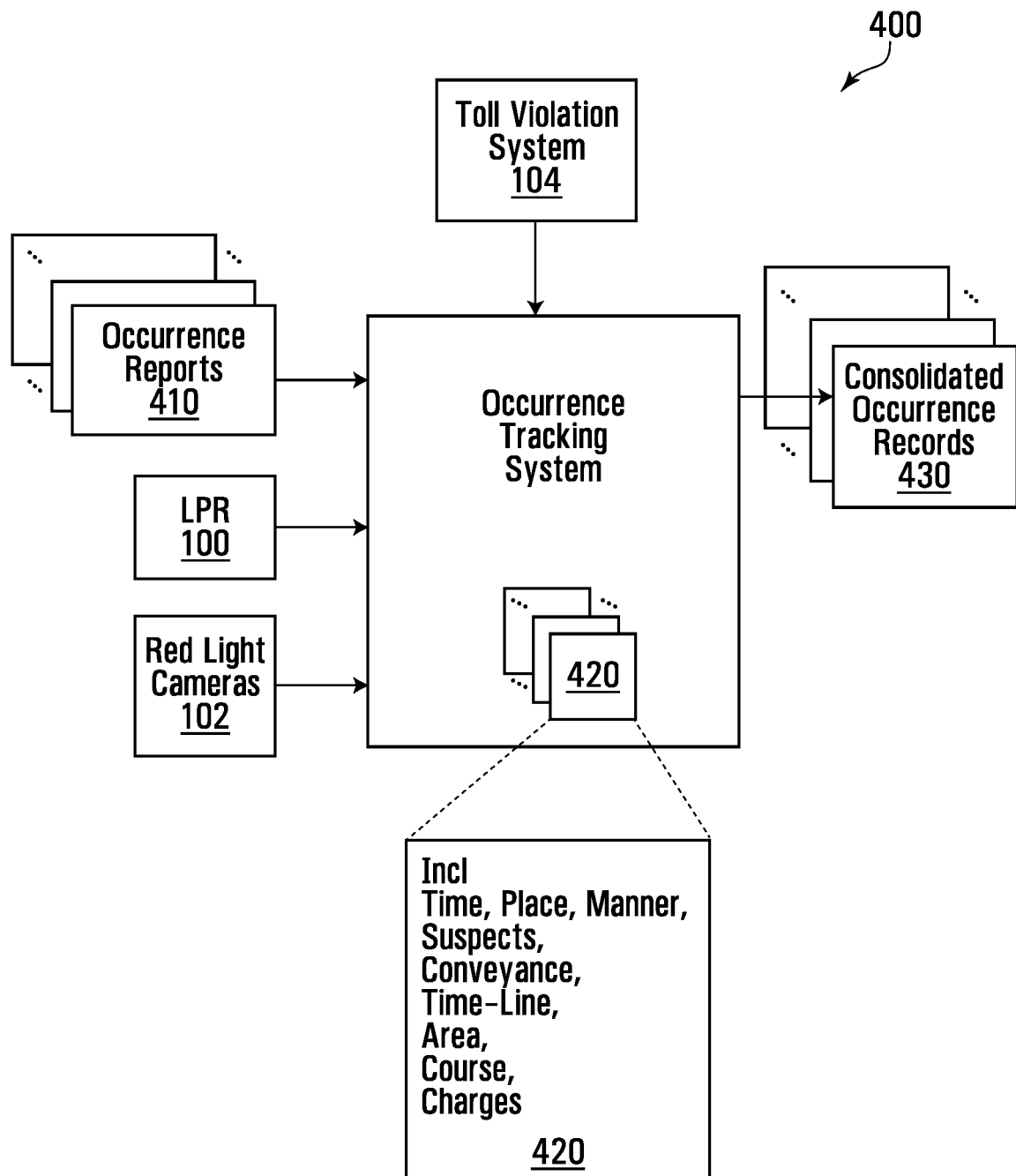
FIG. 4 is a block diagram illustrating an occurrence tracking system (OTS) in accordance with an exemplary embodiment of the present disclosure.

As shown in FIG. 4, an occurrence tracking system (OTS) in accordance with an exemplary embodiment of the present disclosure is indicated generally by the reference numeral 400. In various jurisdictions, the occurrence tracking system may receive occurrence reports 410, preferably one per event or caller, manually and/or automatically from a variety of sources, such as, for example, LPR hits from mobile LPRs 100, LPR reads from fixed red-light cameras 102, LPR reads from road toll violation systems 104, incident reports from law enforcement officers (LEOs) 205, complaints filed by private citizens, or the like. The OTS 400 may store internal occurrence data records 420 including one or more of time, place, manner, suspects, conveyances, timeline, geographic area, course, and potentially chargeable offences. The OTS 400 may consolidate multiple reports from different sources into a single consolidated occurrence record 430, preferably one per consolidated occurrence. The OTS 400 may output occurrence data records 420 and/or consolidated occurrence records 430.

In an exemplary embodiment, investigable events and occurrence records are sourced from police reports, but it shall be understood that other sources such as independently actionable LPR reads, red light camera reads and the like may also generate occurrence records. Moreover, the systems and methods disclosed herein are not limited to law enforcement and security applications, and may be used in alternate environments undertaking to associate occurrences with media from disparate sources.

Figure 5:
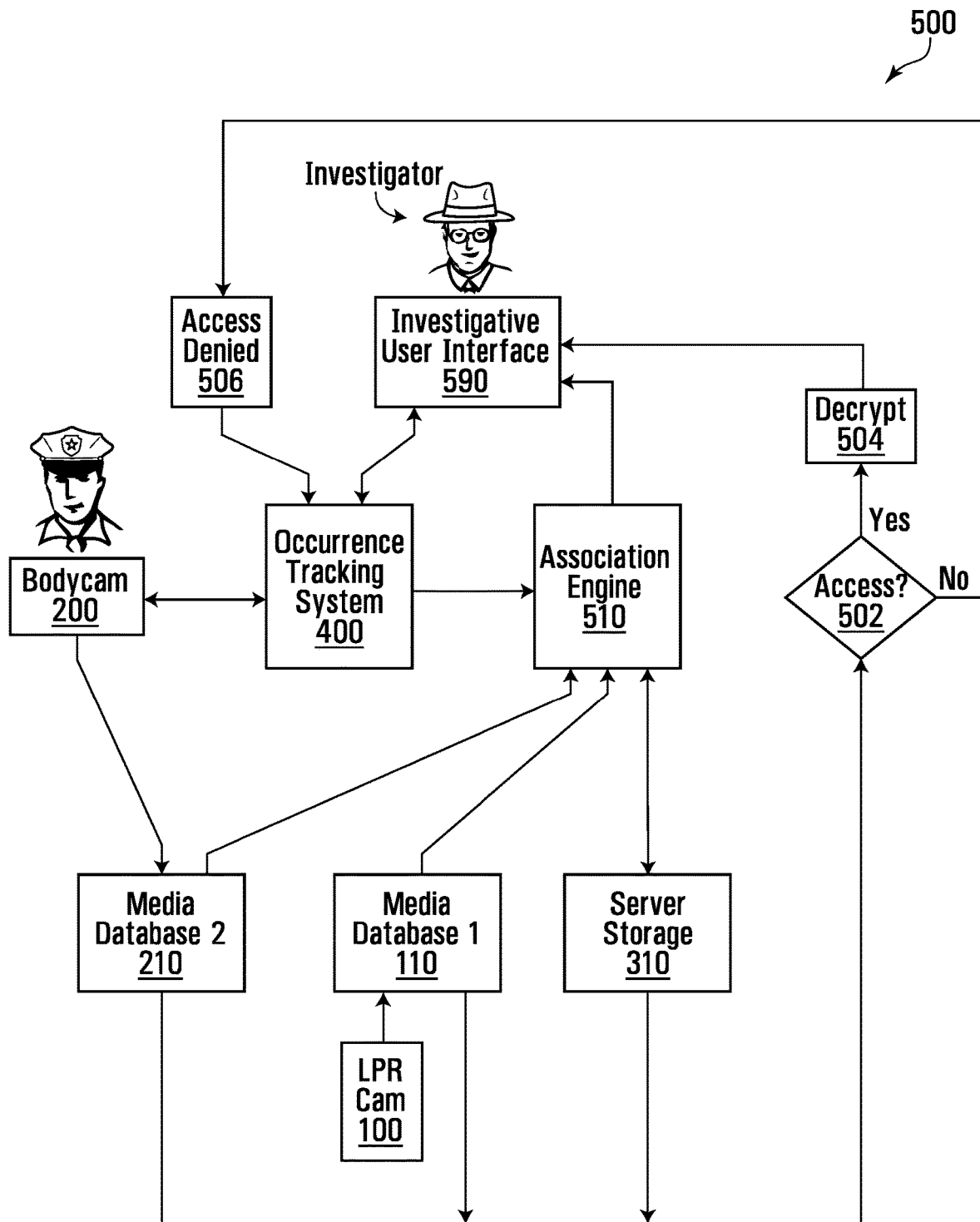
FIG. 5 is a block diagram illustrating an occurrence to media association engine in accordance with an exemplary embodiment of the present disclosure.

Turning to FIG. 5, an occurrence to media association engine in accordance with an exemplary embodiment of the present disclosure is indicated generally by the reference numeral 500. The occurrence to media association engine 500 may be connected to a variety of media databases, including, for example, an LPR database 110 connected to an LPR system 100, a bodycam database 210 connected to a bodycam system 200, and/or an incident site database 310 connected to an incident site security system 300.

Since the occurrence to media association engine 500 may be connected to multiple databases, the engine's internal database may include records having external pointers to media maintained predominantly or entirely within such separate databases. The engine 500 is further connected to the OTS 400 for receiving occurrence records 420 and/or consolidated occurrence records 430. Optionally, such occurrence records are either linked by additional external pointers to such OTS 400 database records, or the data may be duplicated within the engine 500's internal database.

The occurrence to media association engine 500 is further connected to an investigative user interface 590, which may be in further communication with the OTS 400. Received event data, footage and the results of occurrence tracking may be exported to an external investigative user interface such as Genetec™ ClearID™. The investigative user interface 590 provides user interface tools to ascertain user privileges/permissions, interface with database data and provide access to investigative data. When an authorized user accessing the investigative user interface 590 accesses an occurrence complaint or record 420 or 430, the association engine 510 may automatically provide a list of media potentially associated with such occurrence in the manner taught herein, and may optionally decrypt and/or grant access to such media. Such listing, decryption and/or access grant may be provided in real-time and/or upon supervisory approval of an automated requisition request, for example, depending upon the authorization level of the user and/or the sensitivity or confidentiality of the media, for example. Stream management, including access control, may be implemented in the manner described in PCT International Patent Application number PCT/CA2016/051350 published under publication number WO2017083980 and PCT International Patent Application number PCT/CA2016/051358 published under publication number WO2017083985, both of which are incorporated herein by reference.

Although access to the system is shown as separate from the investigative user interface 590, it will be appreciated that control over access may be implemented by the investigative user interface 590 or by another component of the system. In one embodiment described herein, association may take place in the association engine 510 pre-emptively, that is to say not in response to a search query for a particular association, upon upload or on request. If the association engine were activated in response to a specific query, access verification as done at 502 may be implemented closer to or by the association engine 510. Other implementations of access verification may be used. If access is granted to the requisitioned media or a portion thereof by the association engine 510, a decision block 502 passes control to a decryption block 504, which, in turn, passes access to decrypted media to the user interface 590. It shall be understood that the encrypted media or record pointers thereto may be partially or fully decrypted, partially or fully re-encrypted using encryption decryptable by the particular user or user interface, and/or have an outer layer decrypted where an inner layer is still encrypted but only with encryption decryptable by the user and/or investigative user interface 590. Such media or record pointers thereto may then be delivered to the investigative user interface 590. If, on the other hand, access is not granted to the requisitioned media or a portion thereof by the association engine 510, the decision block 502 passes control to an access denial block 506, which provides another input to the tracking system 400. In a particular embodiment illustrated here, access may be granted by decrypting encrypted stream/data. Indeed data may be stored encrypted. Such data may be made accessible only to individuals owning a decryption key matching the encryption used. Ownership of such decryption key may be used to prove access rights. For example, if the encryption can be trusted, there is no harm providing the encrypted data to all who request it, since only those with the right decryption key will be able to access it. In this way, decryption 504 and access verification 502 may be a same step. A combination of access verification and encryption access control is used here such that the user credentials are verified prior to providing encrypted data, but the data is nonetheless provided encrypted such that the user's decryption key is required to view the data. In this way, chain of custody is protected.

Figure 6:
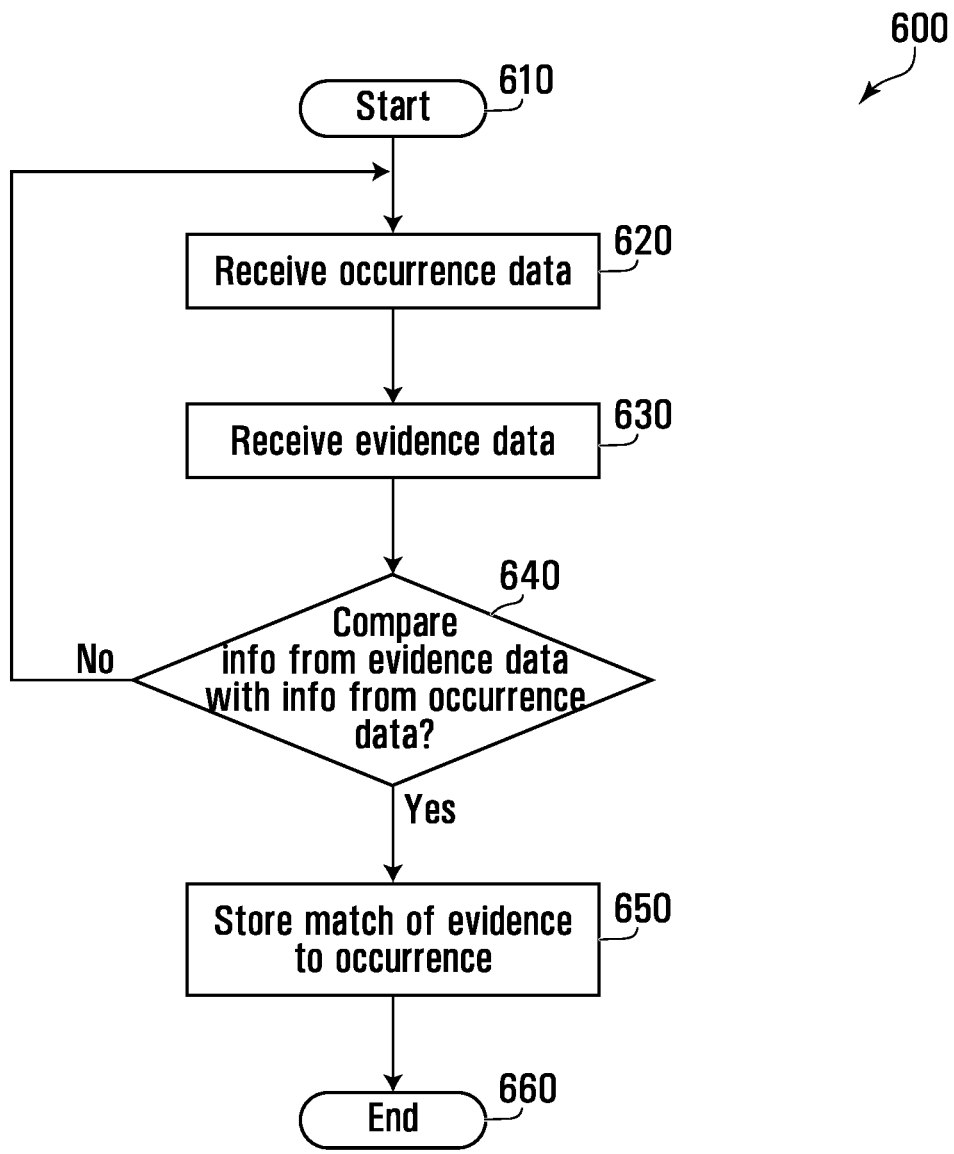
FIG. 6 is flow diagram illustrating an occurrence to evidence association method in accordance with an exemplary embodiment of the present disclosure.

Turning now to FIG. 6, an occurrence to evidence association method in accordance with an exemplary embodiment of the present disclosure is indicated generally by the reference numeral 600. After an arbitrary start 610, occurrence data is received 620. This may occur in different ways depending on the occurrence data gathering system and backend used. For example, a license plate recognition (LPR) system such as Genetec™ AutoVu™ may gather occurrence records including plate reads and the data may be uploaded to a Genetec™ Security Center system, e.g. automatically upon connection to the Security Center server once the LPR unit comes into range of a home WiFi system. Evidence data is also received 630. Here too, the way data is received and accepted may vary based on the evidence data gathering system and the backend used. For example, bodycams footage may be stored as discrete (e.g. max 2 minute segment) files and along with metadata and uploaded to the server, e.g. Genetec™ Security Center upon docking the bodycam to a charger unit connected to Security Center. At some point, a comparison 640 between evidence data and occurrence data occurs. In certain examples, this may be triggered by receiving the evidence data 630, which prompts an identification of the related occurrence data. However, this may be also done on a scheduled basis, or upon receiving occurrence data 620, upon manual triggering or otherwise. As such, although in this particular illustration, receiving the evidence data 630 is illustrated as being down the flowchart from receiving the occurrence data 620, however, this is only to simplify the flowchart illustration. In fact, the order may be varied. Continuing with the illustrated example, the decision block 640, in turn, compares information from the received evidence data with information from the received occurrence data, and if there is no match, passes control back to input block 620. If there is a match, the decision block 640 passes control to an output block 650, which stores the match of evidence data to occurrence data as an association. The method is then shown as ending 660, since this is an illustrative example intended to convey to the reader the required know-how. However, it will be appreciated, that the steps described herein may be repeated to find more matches (e.g. upon receiving batch data), on a scheduled basis or otherwise. As described, in some embodiments, the method 600 may be automatically initiated without human intervention upon receiving fresh occurrence data and/or fresh evidence data, as well as periodically or upon request. Even if manually initiated, the described mechanics for automated association of evidence data and occurrence data may be used such that a user need not necessarily have access to the data to trigger association. This lack of access may protect the data from human tampering, deletion, or other corruption and protect the chain of custody. In other embodiments, the structure of the database may be configured to intrinsically associate occurrence data and evidence data that share the same or proximate time and/or location coordinates.

In preferred embodiments, the occurrence to evidence association method 600 may be implemented by the management sever 300, occurrence tracking system 400 and/or the occurrence to media association engine 500 to automatically authorize or provide access and decryption to evidence such as video clips where such evidence has been automatically associated with an occurrence to which the user interface has access, such as all evidence obtained in the vicinity of an occurrence and/or related to the time-line path of a suspect or conveyance implicated in the occurrence. This may include parked vehicle evidence from LPR systems, whether from a city street, parking lot, and/or parking garage entrance or exit, for example, for all sightings of a vehicle associated with a license plate number of record for the occurrence and/or suspect, even if such sightings were outside of the known envelope of time and location (e.g., descriptive location such as street address, and/or geolocation such as GPS coordinates) of occurrence. The investigative user interface 590 may be implemented in software and/or as a physical workstation that automatically provides access to all such associated evidence based on an underlying authorization to view the occurrence record, without requiring a separate channel of authorization, or may automatically request such authorization in optional embodiments.

In another example, automatic permission may be granted to access media evidence associated with the occurrence based on (or as a function of) a level of authorization versus degrees of separation of a video clip, for example, such as if one may open the occurrence file, one may also see the bodycam footage of an event but not the footage substantially before or after the event. That is, as the degree of relatedness to an occurrence increases, such as having multiple links to information fields in the occurrence record 420, the level of authorization required to view that evidence may be decreased.

Similarly, permissions may be granted to different users with access to different occurrence records, respectively, for the same or overlapping evidence footage where the different occurrence records each have sufficient criteria matching that of the same or overlapping evidence footage to be associated with that same or overlapping evidence footage. Such same or overlapping evidence footage may be or include body camera or bodycam footage (BCF).

Figure 7:
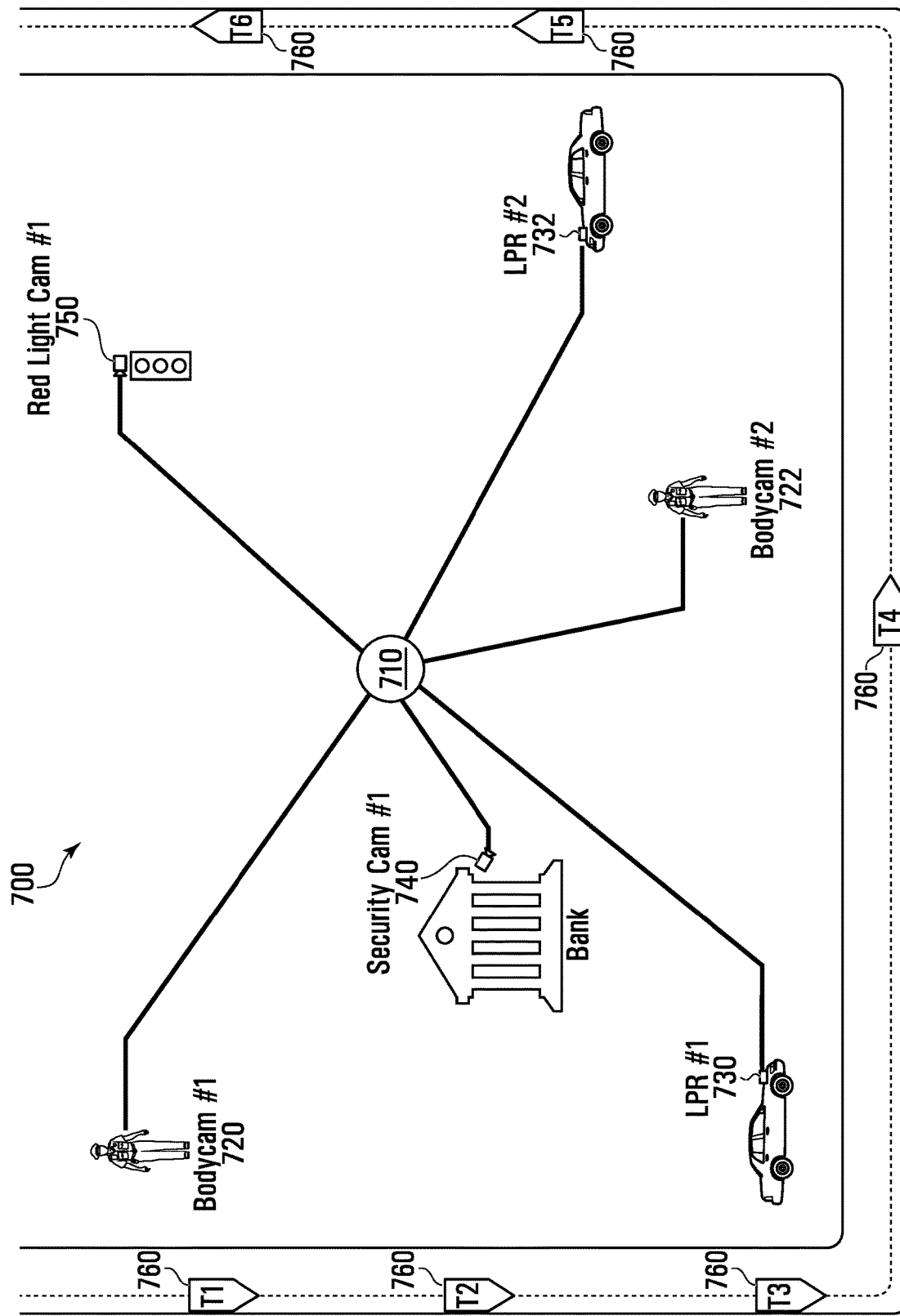
FIG. 7 is a schematic diagram illustrating an evidence management system in accordance with an exemplary embodiment of the present disclosure.

As shown in FIG. 7, an evidence management system 700 in accordance with an exemplary embodiment of the present disclosure is indicated generally by the reference numeral 700. The evidence management system 700 includes an association engine 710 connected to each of a first body camera (bodycam) 720, a second bodycam 722, a first license plate reader (LPR) 730, a second LPR 732, a first security camera 740, and a first traffic or red-light camera 750.

A getaway vehicle 760 is indicated at times T1, T2, T3, T4, T5, and T6. At time T1, the bodycam 720 happens to catch an image of a vehicle 760 and an occupant during what turns out to be an approach to a bank. At time T2, during a bank robbery, the bank's security camera 740 catches images of a suspect and the getaway vehicle 760. At time T3, the LPR 730 reads the license plate number of the vehicle 760. At time T4, the bodycam 722 records images of the getaway vehicle 760 and an occupant. At time T5, the LPR 732 reads the license plate number of the vehicle 760. At time T6, the red-light camera 750 records the license plate number of the vehicle 760 as well as the face of its driver.

The system 700 is shown in this simplified form for ease of explanation, but it shall be understood that real-world embodiments may have access to several hundred bodycams and dozens of LPRs such as might be deployed within a police force. If a shooting, robbery or other serious crime takes place at a given time, it would take an investigator a significant amount of time to manually procure and scan the video recording data of all potential bodycams within the timeframe to determine whether there was anything captured that happens to be pertinent.

The present embodiment provides a tool to automatically remove from consideration all of the video camera recording data that is not recorded near the location of the occurrence, suspects, or their conveyances during proximate time periods, so as to consider only the potentially pertinent evidence. The LPRs in a city receive licence plate data, time and location. Robberies and shootings are occurrences that generally have a known time and location, and depending upon incidental evidence such as whether observers note that a vehicle having particular characteristics was involved, the system may use any available camera footage and/or LPR images to find the vehicle and its license plate number, for example. Then, an investigator can query the LPR database for the license plate. This can give a set of locations for the vehicle over time during the approach and the getaway from a crime scene. LPRs capture the license plate and the image of the license plate area, as well as date, time and/or location, but generally do not capture imagery beyond the license plate area of a vehicle. Street cameras, traffic cameras and bodycams are better for providing good video, but sifting through all of the video from all available cameras for the whole duration of the alleged criminal activity, such as from suspects approaching a crime scene to making a getaway, is generally impractical. By associating events and locations to footage, the non-associated footage may be discarded from consideration without human intervention to do so.

The system 700 allows investigators to enter a license plate number, such as after obtaining it from an eye-witness or from any incidental camera footage, and to collect the brief video clips of all bodycams near where the vehicle was detected by LPRs around the specific time and location of detection. The pertinent bodycams might be narrowed down from an area spanning the entire city depending on the circumstances. For example, if a getaway car speeds by, and an officer on foot patrol turns to look at it or otherwise catches it on video from his or her bodycam, this can provide useful video information. Thus, the path taken by the criminals may be automatically associated with the location and time from where and when the camera clips showing that vehicle and/or license plate were taken.

The system 700's ability to access LPRs distributed through an area make it more likely that the occurrence record may identify an event as happening among a number of physical locations at different times, which might otherwise require time-consuming investigation of witnesses to piece together the movement of the perpetrators through a neighborhood, for example. When the location is a single location and the time is a short duration, the number of cameras is limited and the likelihood increases that the officers near the crime scene were acutely aware that what they observed or captured was material to the crime; but the probability of such acute awareness decreases for events, including approaches and getaways, that take place over greater areas and time periods. When LPRs are in use, the officers' bodycams may be used by the system to capture incidental footage of the criminals as they move to and from the crime scene, for example. That is, once tracking of location of the crime vehicle or suspects has begun, video data may be automatically collected from cameras located near points following one or more paths related to the tracking within defined time periods.

It shall be understood that the single association engine of the system 700 is for illustrative purposes only, in that groups of cameras of a given type may be connected to dedicated servers for their respective types, or even to their own individual or built-in servers, such that queries need not be executed entirely from a centralized investigative workstation. The association engine 710 may be considered to be where the investigative query based on an occurrence may take place, but it need not store or even receive the actual video data, as metadata may suffice; or in a highly distributed embodiment, portions of the query might be sent directly to each camera's server or control device. That is, where a single server is considered for illustrative purposes, it shall be understood that multiple or distributed servers may be used, and that the occurrence data and evidence data need not be stored on that server or servers, without limitation.

For privacy and security reasons, an investigator might not have indiscriminate access to all bodycam or street camera footage for all locations and times. The system 700 can automatically provide permissions, and optionally decryption, for the relevant video clips and queue them up for viewing and annotating at a workstation to be used by the investigator. For example, in response to an investigative query based on occurrence data, the system might provide the investigator with 60 one-minute clips to review, which might be an hour's viewing at 1× video speed, or possibly 15 to 20 minutes at 4× video speed, even if the entire video review is performed manually by one investigator. However, the system 700's value is evident in both the thoroughness and efficiency of identifying the potentially pertinent media, as well as providing access to it and decrypting as required.

It shall be understood that the course data field or pointer of occurrence record 420 of FIG. 4 may include a known course, a reconstructed course, and/or a possible course of a suspect or conveyance. Similarly, the time-wise course followed by the vehicle 760 may include known courses, reconstructed courses, and/or possible courses of suspects and/or conveyances associated with an occurrence.

In operation, the occurrence tracking system 400 and/or management system 300 exchanges data with the LPR system 100, for example. Thus, the LPR system 100 may include, or be connected to, a wireless communication interface 130 which may include, for example, a cellular or Wi-Fi module and an antenna 135. Where a cellular data connexion is provided to the LPR system 100, the LPR system 100 and the management system 300 may engage in on-demand exchanges of data. Optionally, the LPR system 100 may only have a Wi-Fi module intended for communicating with the management system 300 when within a Wi-Fi network (e.g., when a police vehicle arrives at a police station parking lot or maintenance garage after a shift). In such cases, communications between the LPR system 100 and the management system 300 may take place on a scheduled or on-availability basis. Each system may therefore store data intended for communication to the other for transmission when possible according to schedule or availability of communication. Alternate systems may only communicate by other means, such as by physically connecting to a network, or even by transferring data from the LPR system 100 to the management system 300 over USB sticks. Although wireless data connected systems are preferred, LPR systems requiring USB data transfers are also supported.

The reading of a license plate creates a read event in the LPR system 100. Read events may be stored in a data structure, file, association of data, or the like. Read events are optionally stored locally but also shared with the management system 300. In the present example, the LPR system 100 is data-connected to the management system 300 via an LTE connection and all read events are generally transmitted to the management system 300. Data transfers over wireless (e.g., LTE) connections may take place in real-time, or in bulk upon or soon after data generation (e.g., generation of an occurrence record, or of bodycam video file creation) or streamed during data generation, subject to availability of connection (e.g., data may be buffered and transmitted later when a connection is not currently available). Alternatively, only certain read events that meet certain criteria might be transmitted.

In an exemplary embodiment, the LPR system 100 may be used to enforce parking rules, including overtime parking and permit violations. This LPR system 100 stores parking rules associated with the area in which it operates, received here from the management system 300. The LPR system 100 may store a permit list such as a list of license plate numbers associated with valid permits for a particular zone, such that when patrolling that zone, each plate read can be verified against the rules (e.g., permit requirements) and checked for permits. The LPR system 100 optionally stores past plate reads locally such that it can verify new plate reads against past events, such as, for example, to detect overtime violations (parking for longer than the allowed timeframe as evidence by a current plate read matching a past plate read in the same spot) or shared permit violations (e.g., two license plates sharing a permit are both using it on the same day as evidenced by a current plate read matching the permit number of another plate read earlier).

Optionally, the LPR system 100 may receive from the management system 300 past plate read events, such as those captured by other LPR systems on other vehicles, for detecting violations spanning multiple plate reads by different LPR systems. Alternately, rather than detecting violations locally, plate read events may be transferred to the management system 300 for analysis and/or detection of violations by the management system 300.

Certain plate read events may be actionable such that certain actions are associated with the plate read. This might be because a parking violation is detected, for example, in which case a parking violation event is created (or the plate read event is enhanced to be a violation event) including details of the violation. In the event of a parking violation, certain evidence may be collected. For example, whereas plate read events may contain small amounts of data (e.g., license plate read, etc.), violation events may store additional data such as context images, additional images, the name of the officer using the LPR system 100, and the like.

Another actionable plate read event would be a plate read event where the read plate corresponds to a plate number on a "hit list", such as a list of plates associated with wanted individuals, stolen vehicles, or the like. In general, a hit list is a list of license plates that are actionable upon detection. There may be different types of hits, with the type being specified in the hit list for each plate, or with different hit lists being stored for different types of hits (wanted list, amber alert list, etc.). Optionally, hit lists of wanted plates are downloaded to the LPR system 100 from the management system 300.

As the vehicle 105 travels, any plates passing within the field of vision of the LPR camera may be read and checked against the hit list. If a plate from the hit list is detected, the LPR system 100 undertakes a set of actions, optionally predetermined in the system for the type of hit, responsive to the detection. This may include flashing a warning to the user of the LPR system 100 via the interface 140 (e.g., a sound is played and/or a red flashing sign is displayed on the display 145) that a hit list plate was detected, and possibly additional details on the display 145, such as the plate number and car make/model, as well as reasons the plate is on the hit list (e.g., wanted individual, amber alert, stolen vehicle, etc.).

An actionable plate read may result from detection of a violation. For example, if a plate read event leads to a determination of a violation, this is optionally treated by the LPR system 100 as an actionable plate read requiring in response that the LPR system undertake certain actions, optionally actions that are predetermined in the system for this kind of violation. Conceivably, other types of assessments resulting from analysis of a plate read may also lead to a determination that a plate read is actionable. For example, if a plate is detectable (e.g., there is a licence plate here) but cannot be read (e.g., because it is too soiled and/or weathered, or because it may have been tampered with), this may be assessed as being actionable, causing the LPR system 100 to alert the user to follow up and either receive input from the user with the license plate number (e.g., if it is readable by the user), receive a violation indication by the user (e.g., hidden plate violation) or receive input indicative that the license plate was a false detection (e.g., no license plate present).

In certain cases, an actionable license plate read event might not be immediately triggered by a license plate read, but another event might trigger it with the license plate number becoming associated with the event at a later time. For example, if the LPR system 100 detects a vehicle but cannot locate/detect a license plate, an actionable plate read event may be triggered with the license plate number being missing to be entered later, either when the license plate is eventually read by the system (e.g., as the vehicle 105 moves closer) or is entered manually (e.g., if the plate detection algorithm failed but the detected vehicle does indeed have a license plate).

An actionable plate read may optionally trigger instructional output for certain user actions. Whether defined by learned protocol or defined by instructions provided by the LPR system 100, where the providing of such instructions may be predetermined actions in the system for the type of actionable plate read at issue, an actionable plate read may optionally require user intervention. For example, in the event of an amber alert hit list detection by a police officer, the LPR system 100 may be programmed to automatically report the detection to the management system 300, to clearly indicate the detection to the user of the LPR system 100, and the police officer aboard the vehicle 105 may then be expected or advised to stop the vehicle and search it for the missing subject of the amber alert. In another example, if a parking violation is detected, an officer, potentially the user of the LPR system 100, may be expected or advised to physically ticket the violating vehicle.

Bodycams may be worn by members of services, such as police officers, bylaw enforcement officers, private security, and the like to record evidentiary views, as well as interactions and interventions by such members. In contrast to context cameras, bodycams may generally be standalone pieces of equipment rather than a permanent part of the LPR system 100. In any event, a bodycam may be separate from the LPR system 100. Optionally, a vehicle may be operated by a parking enforcement officer, who might in turn be equipped with a bodycam. In such cases, the bodycam imagery may be used to supplement the plate read image, particularly if it catches other portions of the vehicle, driver, or surroundings.

The server 305 receives plate reads and other relevant data from the LPR system 100 and optionally stores this data on the server storage 310. In this example, actionable plate reads, violation events, and the like are special cases of plate reads, such that they may be represented in database record memory as a plate read with associated action/violation data. Such read records may be stored as separate structures, although these are still considered read events for the purposes of this description. Here, the management system 300, and more particularly the server storage 310, includes a set of plate read events in a repository, implemented here as a custom database.

In the present embodiment, the management system 300 also communicates with bodycams (e.g., bodycam 200) in order to exchange data, which may include bodycam control data, with the bodycams and optionally to receive video and related data from the bodycams. The server 305 optionally stores bodycam video in the server storage 310. Such video files may be uploaded to the server from the bodycam 200 by the operator on demand by the operator, or the server 300 may pull data from the bodycam 200, or the bodycam 200 may upload its video to the server 305 continuously or on an ad hoc basis. Thus, the management system 300, and more particularly the server storage 310, may maintain a quantity of bodycam video footage and/or pointers to such media records in its database.

Bodycam video footage may be considered to include video segments. Bodycam 20 records video and optionally stores it into separate files. Some bodycams may record video into a file until it reaches a certain threshold file size (e.g., 2 gigabytes or GB), upon which it will create a new file for future footage. The result may be that the video from the bodycam is stored into a series of files, each of 2 GB or less, for example. The server 305 may do the same if it receives live video from the bodycam. Alternatively, the bodycam may record into a plurality of larger or smaller files, or into a single large file. Video files may contain overlapping video (e.g., 5 seconds on each end) to ensure that if an important event arrives at the end of a file, no information is lost or unnecessarily hard to locate as a result of the file cut-off. Video segments are portions of video between time stamps regardless of file size boundaries. When a bodycam captures an event of interest, a corresponding segment may be an entire video file (e.g., the 2 GB video file on which the event occurs), a number of video files (e.g., two files containing video feed relevant to the segment on either side of their meeting point), or a portion of a video file (e.g., the relevant portion of a larger video file).

When the server 305 receives bodycam video data, this video data is accompanied by metadata (e.g., in the video stream/file itself as defined in the video encoding standard used; although metadata may also be provided in separate files), where the server 305 extracts the metadata and stores it according to its own format in association with the video data (e.g., files) for future reference. Metadata received with the video may include time-of-capture data, location data (e.g., GPS data), device ID data (e.g., bodycam ID or BID), and the like. Such data may be extracted and stored as associated with video files containing the video data. The video data may be kept in its native format, or may be re-encoded into a different format used within the management system 300.

Optionally, video segments may be defined in a number of ways. Here in this embodiment, a video segment is defined by a particular timeframe. For example, if an event occurred at 12:05:00 p.m. and is determined to have lasted 2 minutes, the corresponding video segment may be the video data for 12:05:00 p.m. to 12:07:00 p.m., for example, whether that video data spans one file, multiple files or only a portion of a file. The server 305 can extract segments of video from video data stored directly or indirectly in the server storage 310. In this particular example, the server 305 creates new video files from stored video data corresponding to a particular segment. The particular segment may be defined by several factors including a particular time window and a particular bodycam device.

For example, if a segment of interest is the view from bodycam #35 yesterday at 1:54:30 p.m. to 1:58:30 p.m., then the server 305 may consult the database in server storage 310 to identify which video data file(s) contain such data such as by first identifying the video files corresponding to bodycam #35, then finding the footage from yesterday, then identifying which file(s) contain video footage for the relevant time period. The server may then create a new video file from the one or more video files containing the relevant footage, the new file comprising only the relevant footage. Note that depending on the use for a video segment, it is not always necessary to record a new file for the segment. For many uses, it may suffice to identify a video segment so that it may be expeditiously located later, if needed, and whereupon a segment file may be created, as required.

Advantageously, the management system 300, and more particularly the server 305, automatically links video segments from bodycam footage to occurrences. In the present exemplary embodiment, the server 305 automatically links bodycam video segments to license plate read events.

Optionally, each bodycam is associated with a particular officer, user or LPR system 100. For example, each bodycam may be permanently assigned to an officer, whereby the bodycam ID is directly associated with the officer. In one example, however, bodycams are taken out at the beginning of a shift and returned at the end of the shift such that at each shift, an officer may be using a different bodycam. This can make it difficult to identify footage related to an occurrence. But if by taking out a bodycam, an officer becomes associated with the bodycam for a known period of time, the officer-to-bodycam association may be recorded in a number of ways. For example, someone in charge of the equipment may record into server 305 which officer (e.g., identified by an officer ID) has taken which bodycam (e.g., by bodycam ID) every day. Alternatively, when uploading footage, an officer ID may be submitted with the video footage. This may be manually entered by the user or it may be automatically provided, such as when based on the login credentials of the user logging into an upload portal for the system.

Alternatively, in the case of more advanced bodycams which have sophisticated input interfaces, an officer may log into the bodycam 200, e.g., by scanning an RFID card or inputting credentials. The bodycam may record the officer's ID for later or, if connected to the management system 300, may communicate it with the management system 300, such as for authentication. Optionally, the bodycam may automatically identify its current user by self portrait (selfie), fingerprint reader and/or other biometric means.

Moreover, the officer may likewise be associated with an LPR system. This may be done in any manner. For example, an officer may have an assigned vehicle comprising an installed LPR system, or the officer may be assigned a vehicle/LPR system, in which case the officer-to-LPR system may be recorded into the server 305 in any of the manners described with respect to the bodycam 200.

A bodycam is generally associated with a user/wearer, but optionally may be associated with an LPR system such as when left with a particular vehicle at the end of each shift, and/or automatically when in substantially continuous proximity to a given police vehicle in motion. In such a case, although the bodycam remains physically separate from the vehicle and/or LPR, the logical association may be recorded as described above, where instead of or in addition to the officer's information, the LPR system's identification is provided, which may further include the officer's information associated with the vehicle and/or LPR system for a given period of time. The inverse is also possible, where the LPR system is associated with a bodycam.

The server 305 automatically associates occurrences with video segments from the bodycam 200 and stores these associations, such as in server storage 310. In one particular example, an association between bodycam footage and plate read events is stored as metadata to the plate read event in the plate read event data structure or database entry in memory. As described, a plate read event may be stored by the management system 300 in server storage 310. Occurrences, such as actionable plate read events, for example, may be stored as a dataset such as a data structure, database entry, or the like. In this example, the dataset is augmented to include an identification of a video segment associated with the plate read.

The video segment may be identified in any suitable manner. In an embodiment, a video segment identifier points to one or more video files in the server storage, and associated chronological markers within those video files (e.g., progress, such as "at 2 minutes and 33 seconds into the video"; or actual time of day, where available, with the video file). In another example, the video segment identifier may point only to one or more file(s), such as if a video segment file has been prepared or if the granularity of the system is such that relevant segments are identified only by file-size intervals. Alternatively, the actual video data for the video segment (e.g., segment file) may be stored in the occurrence dataset.

In preferred embodiments, the process of associating media such as bodycam video segments with occurrences is triggered by an event detected by the server 305 such as an interaction with the server. In this particular example, the association is triggered by receipt at the server 305 of bodycam footage from the bodycam 200. Upon receiving bodycam video data, the server 305 processes the video data and associated metadata in order to identify an LPR system associated with the video data. In this particular example, this is done by first identifying an officer ID associated with the bodycam footage. Identifying the officer ID may be done by finding the officer ID in the video data metadata, if present therein, however in instances where officer-to-bodycam association is done externally to the bodycam, such as when a user in charge of the equipment registers officer-to-bodycam association, the association may be stored in a table or file within the management system 300. In such cases, the server 305 may identify the officer ID by first identifying a bodycam ID in the transmission received containing the bodycam footage; where this metadata is then used to seek a related officer ID from the stored associations.

Once the officer ID has been found, it is used to identify occurrences, which in this embodiment may be LPR events. Here, although the LPR system 100 has a corresponding LPR system ID which is associated with the officer ID, the LPR system 100 includes the officer ID in the occurrence metadata provided with each occurrence. Thus, the plate read event data contains the officer ID of the officer operating or associated with the LPR system 100, rendering it redundant for the server 305 to first identify the LPR system ID to find occurrences associated with the bodycam video data. Instead, or in addition thereto, the server 305 can simply search through occurrence records, in this case plate read events, for records with the officer ID matching the officer ID for the bodycam 200. Alternately, the server may search bodycam footage from other officers' who were in the vicinity of an event as determined by their bodycam location information. Naturally, the officer ID format may differ between LPR systems and bodycams, which may be addressed by a format translation at the management system 300, occurrence tracking system 400 and/or association system 500.

In alternate embodiments, if the officer ID is not present in occurrence records, or if it is not practical to search for this data due to the format of the occurrence database, the server 305 may find the LPR system ID associated with the officer ID, such as by identifying it in a concordance table or file with the management system 300, or by indirect means such as by verifying the officer ID in a different or sample occurrence record associated with the LPR system 100. The LPR system ID may be obtained in any suitable manner such as in the manners described for the officer ID or bodycam ID.

Occurrence records are further filtered to identify those relevant to the bodycam footage. In particular, the time, date, location and the like of the bodycam footage is identified from the video metadata provided with the bodycam footage, and occurrence records not within a time and geographic range related to the bodycam footage, or alternate occurrence data fields in alternate embodiments, may be ignored for this purpose. This time range may be the time of the footage from start to finish, or a related (e.g., overlapping or partially overlapping) timeframe (e.g., from 5 minutes before the footage starts until 5 minutes afterwards) to capture events ongoing at footage start or to capture precursors of events beginning after video ends. The remaining occurrence records may be associated with a video segment from the bodycam footage.

Determination of the video segment to associate with each occurrence record may be done in different manners. In this particular example, a fixed timeframe is assumed for each occurrence record. For example, each plate read event may be associated with a 10-minute video segment beginning 1 minute before the time of the LPR plate read. Determination of the video segment may be used to determine the time range used to search occurrence records. Once the video segment is identified, it is associated with the occurrence record in the manner described. In this example, video segments may overlap. For example, if an officer generates two plate read events within 2 minutes, the 10-minute video segments associated with each may significantly overlap. In this example, the overlap may be tolerated, but in alternate examples, video segments may be pruned to avoid overlap.

In alternative embodiments, the video segments may be determined differently than according to a fixed timeframe. For example, a video segment for an occurrence record may be timed according to the relationship of the occurrence record with other occurrence records. For example, the video segment for each occurrence record may be the video for the time from the occurrence of a record (e.g., from the plate read) until the next occurrence of the next record in time (e.g., until the next plate read), or from 30 seconds before a plate read to 30 seconds before the next plate read, or the like.

Sometimes, bodycam footage may be received by the server 305 before corresponding plate read events are received. For example, where both the LPR system 100 and the bodycam 200 require manual upload of their data via a USB connection, there is no guarantee that the plate read events associated with the bodycam will be available for association with a video segment before the video segment is uploaded, in which case the association might otherwise be missed. In the present embodiment, association is also triggered by receipt at the server 305 of occurrence data, which in this case includes plate read events.

Upon receipt of a plate read event, the server 305 identifies a bodycam ID associated with the plate read events. In this direction too, the server 305 may rely on an officer ID. In particular, in this example, the server 305 identifies the officer ID associated with the occurrence record. Here, the officer ID is stored in the occurrence record, but alternatively, the server 305 could find it from an LPR system ID as described. The server 305 then identifies the bodycam ID associated with the officer ID, such as by searching through bodycam records for records having the officer ID as metadata, or by consulting a file or table stored with the management system 300.

Similar to occurrence records, bodycam video data may be filtered to narrow in on relevant records. In particular, it may be filtered according to the officer ID, LPR system ID, or bodycam ID as described. It may further be filtered according to time and date such that for a particular occurrence record only video data for the time and date of, or around, the occurrence is considered. Moreover, it may be filtered by location information.

Determination of the video segment related to the occurrence record may be done as described above, such that for a given record, the server 305 determines that, for example, a 10-minute video beginning 1 minute before the occurrence such as a license plate read. Thus, the video segment parameters (e.g., timeframe: time relative to the event, length, etc.) may be used to further filter the video data relative to the occurrence record data (e.g., time and/or place of occurrence) as well.

It should be noted that in alternate embodiments, a bodycam 200 may be registered with the LPR system 100 and/or vice versa such that a bodycam ID of the bodycam 200 is transmitted with license plate read events of the LPR system 100, and/or the LPR system ID of the LPR system 100 is transmitted with the video data of the bodycam 200. This allows the server 305 to obviate the steps otherwise used to identify the officer ID, LPR ID or bodycam ID to find associated occurrence data and/or bodycam video.

This dual trigger may lead to redundancy, but helps avoid incomplete records. Redundancy measures may be implemented where the database structures allow it to reduce or eliminate duplicate associations. In alternate embodiments, such as when one or both of occurrence records and bodycam footage are received live, the association may be triggered by one or the other, such as with appropriate flags being maintained in the record database to track the previously performed associations. Such associations may also be triggered by other events or inputs.

By automatically associating bodycam footage with license plate read events, which themselves are automatically generated by the LPR system 100, the management system 300 becomes a powerful tool for law enforcement and allows more rapid and flexible use and access to the data available within the system. For example, if another police officer accesses a plate read event through the management system 300, such as by using a network-connected computer to access the server 305, they may be presented with the data of the plate read event including relevant bodycam footage. This can be extremely useful for police officers responding to a developing situation. For example if a plate read event corresponds to a hit on a hit list of wanted criminals, a parking bylaw officer using the LPR system that generated the hit, may have been alerted and may have the mandate to exit and observe the occupant of the vehicle without contacting them, and police officers dispatched to the scene may immediately see images of the vehicle's occupant via their in-car computers connected to the management system 300. Likewise, if a parking officer is assaulted on duty, the video footage may be automatically available, particularly if the bodycam 200 and LPR system 100 of the parking officer are connected such that their respective data may be uploaded in real-time to the server 300. Thus, responding police officers may already have an image of the suspect before arriving on the scene.

Moreover, plate read events are often associated with open case files, such as police investigation, insurance investigations or the like. Case files may store evidence and other documents related to an investigation which often needs to be accessed by a number of people (e.g., collaborating investigators, opposing legal counsel, or the like). By associating video data from bodycam footage automatically with a plate read event, such video data may be automatically associated with a case file, rendering it available for scrutiny to the different users having access to the case file. This may also be the case for other occurrence types.

In addition, by becoming associated with a plate read event, the video segment of bodycam footage may be associated with a licence plate, since the plate read event is associated with the license plate. This association can be memorialized in a database of license plates, wherein the video segment may be referred to or copied in an entry for the license plate number that was the target of the plate read event such that the license plate database may be populated with footage of the vehicle and/or the occupants of the vehicle. Thus, a search of the license plate in the license plate database may reveal the bodycam footage. Moreover, insofar as plate read events may be searched by license plate number, a corresponding result may be arrived at by searching through the occurrence database.

Increasingly, bodycams are used beyond traditional policing, such as in municipal bylaw enforcement by parking enforcement officers. Those officers whose job it is to give parking tickets are occasionally subject to abuse from upset alleged parking violators. In such instances, it is useful to have evidence of the abuse readily available, associated with the license plate of the abuser, and rapidly made available to other users of the management system 300, such as by police officers who may respond to the situation. By instantly linking video segments of the abuse to the plate read event or to the license plate, another user, such as a police officer, pulling up data on an occurrence may instantly have access to bodycam video footage of the occurrence, which may provide crucial information such as images of a perpetrator.

In the above-described exemplary embodiment, bodycam footage may be associated with occurrence records on the basis of identifiers associated with the footage and the records, as well as on the basis of time constraints. However, it shall be understood that other parameters may be used in addition to or instead of the exemplary parameters used herein. In an alternate embodiment, time and geolocation data are used.

Bodycams may obtain geolocation data indicative of their position and may provide that alongside video data, such as, for example, in video metadata. Such bodycams can provide geolocation data as video metadata. Depending on the format used, the geolocation data may be stored within the video stream itself or as a separate stream or file. The data may be provided as a series of geolocations associated with moments in time, such as those associated with a particular frame or timestamp. Thus, a geolocation is associated with a portion of the video. Since geolocation is discrete and associated with a portion of the video footage, which may be several frames long. For example, if a geolocation is provided for every second of time, then each geolocation may be associated with a corresponding second of video footage (e.g., 0.5 seconds before and after the time of geolocation, although one could also consider the geolocation to be associated with the footage for the second preceding or following the geolocation's timestamp). In some instances where geolocation data is provided for each frame, the portion of the relevant video may be as small as one frame, such as, for example, might occur when a bodycam or LPR camera moves past an unrealized incident in progress, or past a scene showing potentially pertinent temporally transient evidence shortly before or after an incident occurred.

LPR systems optionally contain accurate geolocation systems to provide accurate locations for license plate read events. The LPR system 100, for example, comprises a GPS system, including GPS antenna 125, with which it records geolocation data that it provides as part of the data provided in a plate read event. In one example, the bodycam footage, and in particular bodycam video segments, are associated with occurrence records at least in part on the basis of geolocation data, and in particular on the basis of respective geolocation data associated with the video data and with the occurrence record.

In an alternate embodiment, the occurrence record dataset includes geolocation for the occurrence, which for the purposes of this example may be a license plate read. Here, the bodycam footage has associated metadata providing the geolocation of the bodycam 200 at set points in time. For purposes of explanation, the set points may be assumed to be at fixed intervals of one second, although this need not be necessarily so and alternate embodiments are not limited thereto. In this example, the server 305 associates video segments to plate read events in a manner similar to those described above, so duplicate description may be omitted. However, instead of searching for associated identifiers and the like, the server 305 here searches for concordance in geolocation.

In particular, the geolocations of one of a plate read event and bodycam video portion may be compared with the geolocation of the other of the plate read event and bodycam video portion to determine whether the two are considered collocated within a particular definition of colocation or given radius. In this example, the definition of colocation is predetermined as being within a certain area from one another, although alternate embodiments may use additional criteria such as movement at the same speed or the like (e.g., as when co-located within a moving vehicle).

The management system 300 may trigger association upon receiving a plate read event, upon receiving bodycam footage, or at another time. The association may, for example, be triggered at a scheduled time when both a plate read event and bodycam footage for an officer are expected to be received, such as after his or her shift. The association may begin with a plate read event and include search for associated bodycam footage, which was described in the previous example as being when the trigger is receipt of the plate read event, although this is not necessarily so since in alternate embodiments it could be a scheduled trigger or the like. The association may conversely begin with bodycam footage and search for associated plate read events, as described in the previous embodiment as being when the trigger is receipt of the bodycam footage, although this is not necessarily so since, for example, it could be a scheduled or other trigger in alternate embodiments.

In the present example, association based on geolocation begins with a plate read event. As described, a particular area is defined around the plate read event, which, in this illustrative example, is circular and defined by a radius. In this example, the radius is pre-set to 50 meters for descriptive purposes. The server 305 then filters bodycam footage by both time constraints as above and geolocation to select only video portions that have a geolocation within the given area. The inverse may also be done, whereby each video geolocation is assigned an area and the occurrence records are searched for occurrences having a geolocation within the area, although this may lead to higher computational requirements given the large number of areas to compare.

In order to simplify the computations in either direction, geolocations of video data may be subsampled to consider fewer geolocation points of video, the corresponding video portion being increased as a function of the subsampling to compensate. Alternately, a perimeter determination algorithm may be used to broadly assess the range of locations covered by a camera over a broader expanse of time.

Those of ordinary skill in the pertinent art will appreciate that associating occurrence records, and particularly plate read events, with substantially independent media such as bodycam footage (BCF) on the basis of geolocation provides several advantages. For one, it simplifies management of bodycams since wearers of the bodycams do not need to be carefully tracked. For another, doing so allows the management system 300 to identify any bodycam that is within a range of an occurrence event, and not just the bodycam of the officer or officers responsible for the plate read. As such, if multiple officers are involved in an event, or if another officer happens to be nearby, any and all such bodycam footage that might have captured a view of the event may be collected rapidly and automatically.

It should be noted that bodycam footage may be encrypted and/or rendered unavailable to the user or officer wearing the bodycam 200. This is increasingly demanded to prevent tampering and the like. Embodiments of the present disclosure are particularly suitable for such scenarios because association of bodycam footage to event occurrences no longer requires human intervention, and particularly does not require intervention of the bodycam user. Moreover, officers no longer have to manually identify themselves with either the bodycam footage or the associated event.

It should be also noted that in certain instances, the course of action is reversed. Rather than a user operating an LPR system and taking a course of action following a plate read (e.g., identifying a parking violation or a hit list plate), the reverse may occur where the user may witness an event and cause a plate read as a result. For example, if an officer were attacked, or witnessed a possible crime and then engaged an LPR system to record a corresponding plate, the footage would be associated automatically. In such instances, the present disclosure provides additional functionality given the ability to automatically reference bodycam data and plate reads. The parameters provided herein may be made adjustable to account for special circumstances. For example, an officer may be able to extend the default timeframe of the video segment to keep, if for example, they had to follow a suspect for an unusual amount of time before the suspect entered a vehicle where the license plate was read. Such adjustment may be provided to the server 300 in any suitable manner, such as, for example, where the officer may enter it into the LPR system 100 which communicates it as metadata associated with the plate read event, or otherwise makes it known to an investigator using the association system 500.

Moreover, it shall be understood that although in these examples the LPR system 100 was mounted to a car 105, this need not necessarily be the case, as other mounts for LPR systems may include motorcycles, Segways™, scooters or the like, or may even be worn thereby blurring the definitional line between a bodycam and an LPR camera. In certain cases, the wearer of the bodycam 200 may not be the user operating the LPR system 100, or there may be multiple bodycams used with one LPR system. In some cities, LPR-equipped vehicles note parking violations using an LPR system and communicate violations to an officer on foot who issues the tickets. Both the driver of the vehicle and the ticket-provider may wear bodycams, however the one providing the tickets is more likely to be subject to an altercation by an irate alleged parking violator.

In such a system, geolocation-based association may be particularly useful for the foot-patrol officer even though not all bodycams have geolocators. That is, geolocation for the driving officer's bodycam might not be as important in such cases, so the driving officer might still utilize a non-geolocation enabled bodycam and/or one that piggy-backs onto a police cruiser's geolocation system.

As mentioned above, other association parameters may be used in addition to or in lieu of system or user identifiers, time and geolocation, such as those described for occurrence record 420 and the like. In certain cases, association parameters may include the license plate number itself. In the example where a parking officer follows a vehicle-mounted LPR scanner on foot to hand out parking tickets, the server 305 may use otherwise extraneous data, such as the license plate number of the last vehicle ticketed as derived from data received from a ticketing system, to associate video data to license plate reads. The server 305 may use the time and plate number of a ticket issued and time data related to the bodycam video, as described herein, to cross-correlate license plate numbers with time in the bodycam video footage. Thus, the server 305 may correlate bodycam video data to occurrence records on the basis of otherwise extraneous data obtained from a third source other than the bodycam 200 and LPR system 100. The parameters including otherwise extraneous data, license plate number, time, geolocation, identifiers such as user, officer, system IDs and the like, may be combined to identify bodycam footage-to-occurrence record associations, by selecting appropriate filters.

The video segment may be selected as a function of the tickets issued, for example, selecting a segment of one minute prior to issuing a ticket until one minute prior to issuing the next ticket. The video segment may be associated with the license plate number of the ticket issued during the video segment, which, in turn, is associated with the plate read event for the same plate number. Since both video segments and plate read events may have associated plate numbers, one may be used to search the other.

In yet another example, the association may be triggered by a user intervention of either the bodycam 200 or the LPR system 100. Either system, or both, may have a panic button or the like, indicating that a relevant event is in progress and that footage should be streamed and stored. Alternately, the button may simply be a record button on the bodycam 200. The bodycam may be wirelessly connected and may, as a result, start streaming video to the server, which may be taken by the server 305 as an indication that the button was pressed, for example. The pressing of such a button may be communicated to the server 305, which may trigger an association, optionally immediately or after a delay to account for an accidental button press, between an occurrence record and bodycam footage. Alternatively, such a button press may be used as a parameter for the association filter if, for example, it is desired to only associate to occurrence records footage associated with a button press.

Although exemplary embodiments of the present disclosure have been shown and described, it shall be understood that those of ordinary skill in the pertinent art may make changes therein without departing from the principles, scope or spirit of the inventive concept as defined by the appended claims and their equivalents.

What is claimed is:

1. A method of associating evidence recorded by a media source with a discrete occurrence, the method comprising:
   obtaining occurrence data pertaining to the discrete occurrence and storing at least a portion of the occurrence data in an occurrence record;
   obtaining evidence data containing the evidence recorded by the media source, the evidence data comprising at least media data and related metadata, and storing the media data and the related metadata in an evidence record;
   comparing the metadata and the occurrence data based on at least two criteria, comprising a first criterion of time;
   identifying a first portion of the media data that is related to the discrete occurrence and a second portion of the media data that is unrelated to the discrete occurrence based on the comparing; and
   in response to identifying the first portion of the media data, associating the first portion of the media data to the discrete occurrence and storing an association therebetween in a memory.

2. The method of claim 1, wherein the identifying of the first and second portions of the media data is performed in response to receiving a request to access the occurrence record from an authorized user.

3. The method of claim 1, wherein the obtaining of the occurrence data occurs at a first time and the obtaining of the evidence data occurs at a second time, wherein the identifying of the first and second portions of the media data is performed in response to obtaining a latter-obtained one of the occurrence data and the evidence data.

4. The method of claim 1, wherein the associating of the first portion of the media data to the discrete occurrence comprises generating subsequent metadata comprising an indication of the first portion of the media data and storing the subsequent metadata in the occurrence record in association with the discrete occurrence.

5. The method of claim 1, wherein the associating of the first portion of the media data to the discrete occurrence comprises granting access to at least one of the first portion of the media data and the discrete occurrence to a user based on an authorization level of the user.

6. The method of claim 5, wherein granting access to the at least one of the first portion of the media data and the discrete occurrence to the user comprises decrypting the at least one of the first portion of the media data and the discrete occurrence with a decryption key associated with the user.

7. The method of claim 1, wherein the associating of the first portion of the media data to the discrete occurrence comprises extracting at least one segment from the media data and creating a media file from the at least one segment.

8. The method of claim 1, wherein the obtaining of the occurrence data comprises obtaining a location of the discrete occurrence, and wherein the obtaining of the evidence data comprises obtaining a media source location.

9. The method of claim 8, wherein the obtaining of the media source location comprises deriving the media source location based on a first geolocation receiver connected to the media source or on a second geolocation receiver connected to a separate media source and a media source association, stored in at least one of the occurrence record or the evidence record, between the location of the separate media source and at least one of the media source location or the location of the discrete occurrence.

10. The method of claim 1, wherein the identifying of the first and second portions of the media data comprises comparing the metadata to the occurrence data based on a second criterion of descriptive location, geolocation, user identification (ID), officer ID, camera ID, bodycam ID, car ID, license plate reader (LPR) system ID, license plate ID, or suspect ID.

11. The method of claim 1, comprising selectively providing access to at least one of the occurrence data and the first portion of the media data to a user responsive to ascertaining user permissions of the user.

12. The method of claim 11, wherein selectively providing access to the at least one of the occurrence data and the first portion of the media data comprises decrypting the at least one of the occurrence data and the first portion of the media data.

13. The method of claim 1, wherein the identifying of the first portion of the media data comprises identifying a relationship between an identifier contained in the metadata and an identifier contained in the occurrence data.

14. The method of claim 1, wherein the identifying of the first portion of the media data comprises identifying a colocation of a first geolocation described in the metadata and a second geolocation described in the occurrence data.

15. The method of claim 1, wherein the identifying of the first portion of the media data comprises identifying a relationship between a first license plate identifier contained in the metadata and a second licence plate identifier contained in the occurrence data.

16. The method of claim 1, wherein the obtaining of the occurrence data comprises obtaining a plate read event generated by a license plate reading system, wherein the discrete occurrence is a license plate read.

17. The method of claim 1, wherein the identifying is performed responsive to obtaining the evidence data.

18. The method of claim 1, wherein the identifying is performed responsive to obtaining the occurrence data.

19. The method of claim 1, wherein the identifying of the first portion of the media data comprises identifying a video segment of the evidence data based on a discrete time related to the occurrence data and a predetermined timeframe.

20. A system comprising:
a server including a data ingestion engine connected to a media source; and
a data receiver interface having a first signal connection between the data ingestion engine and a license plate reader (LPR) system, and a second signal connection between the data ingestion engine and a media source;
wherein the system is configured for associating evidence recorded by the media source with a discrete occurrence, comprising:
obtaining occurrence data pertaining to the discrete occurrence and storing at least a portion of the occurrence data in an occurrence record;
obtaining evidence data containing the evidence recorded by the media source, the evidence data comprising at least media data and related metadata, and storing the media data and the related metadata in an evidence record;
comparing the metadata and the occurrence data based on at least two criteria, comprising a first criterion of time;
identifying a first portion of the media data that is related to the discrete occurrence and a second portion of the media data that is unrelated to the discrete occurrence based on the comparing; and
in response to identifying the first portion of the media data, associating the first portion of the media data to the discrete occurrence and storing an association therebetween in a memory.

21. A non-transitory computer-readable medium having stored thereon program instructions executable by a processor which, when executed, cause the processor to perform:
obtaining occurrence data pertaining to the discrete occurrence and storing at least a portion of the occurrence data in an occurrence record;
obtaining evidence data containing the evidence recorded by the media source, the evidence data comprising at least media data and related metadata, and storing the media data and the related metadata in an evidence record;
comparing the metadata and the occurrence data based on at least two criteria, comprising a first criterion of time;
identifying a first portion of the media data that is related to the discrete occurrence and a second portion of the media data that is unrelated to the discrete occurrence based on the comparing; and
in response to identifying the first portion of the media data, associating the first portion of the media data to the discrete occurrence and storing an association therebetween in a memory.

* * * * *